(12) United States Patent
Weatherbee et al.

(10) Patent No.: US 10,303,161 B2
(45) Date of Patent: May 28, 2019

(54) APPARATUS AND METHOD FOR DYNAMIC OPERATION OF MACHINES

(71) Applicant: General Electric Company, Schenectady, NY (US)

(72) Inventors: Paul Weatherbee, Edmonton (CA); Michelle Grady, Foxborough, MA (US)

(73) Assignee: General Electric Company, Schenectady, NY (US)

( * ) Notice: Subject to any disclaimer, the term of this patent is extended or adjusted under 35 U.S.C. 154(b) by 262 days.

(21) Appl. No.: 15/368,204

(22) Filed: Dec. 2, 2016

(65) Prior Publication Data

US 2018/0157222 A1    Jun. 7, 2018

(51) Int. Cl.
*G05B 19/418*    (2006.01)
*G06Q 10/06*    (2012.01)

(52) U.S. Cl.
CPC .............. *G05B 19/41865* (2013.01); *G05B 2219/32301* (2013.01); *G06Q 10/0631* (2013.01); *Y02P 90/20* (2015.11); *Y02P 90/26* (2015.11); *Y02P 90/86* (2015.11)

(58) Field of Classification Search
CPC ........ G05B 13/026; G05B 2219/25419; G06Q 10/0631

USPC ......................................................... 700/101
See application file for complete search history.

(56) References Cited

U.S. PATENT DOCUMENTS 5,195,041 A * 3/1993 George ............ G05B 19/41885
700/100

* cited by examiner

*Primary Examiner* — Fernando Hidalgo
(74) *Attorney, Agent, or Firm* — Fitch, Even, Tabin & Flannery LLP

(57) ABSTRACT

The present invention optimizes the configuration of production lines in a facility, e.g., a factory or industrial facility, through, for example, analyzing scheduling, human factors and other operational information related to the production line and/or facility. In embodiments of the invention described here, facility configuration information is obtained. The configuration information includes an electronic model describing a configuration of machines in a production line. Order information is obtained for a product to be produced by the production line. Operational information related to operation of the production line is obtained. The facility configuration information, a demand information, and the operational information are analyzed to produce an optimal schedule for a usage of the production line. The schedule is applied to the production line.

18 Claims, 4 Drawing Sheets

| DAY/TIME (402) | PRODUCT (404) | MACHINE (406) | OPERATOR (408) |
|---|---|---|---|
| 10/7 12:00AM-12PM | PRODUCT A | MACHINE 1 MACHINE 2 MACHINE 3 | BOB JOHN NATHAN |
| 10/8 12:00AM-3PM | DOWNTIME | DOWNTIME | DOWNTIME |
| 10/8 3PM-6PM | PRODUCT A | MACHINE 1 MACHINE 2 MACHINE 3 | TOM JANE ALEXA |
| 10/8 6PM-12PM | PRODUCT B | MACHINE 1 MACHINE 2 MACHINE 3 | RICH JANE AMANDA |

*FIG. 4*

APPARATUS AND METHOD FOR DYNAMIC OPERATION OF MACHINES

BACKGROUND OF THE INVENTION

Field of the Invention

The subject matter disclosed herein generally relates to industrial machines and, more specifically, to the scheduling of operations, operating parameters and human operators on these machines.

Brief Description of the Related Art

Various types of industrial and other machines are used to perform various manufacturing and industrial operations and tasks. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). In industrial settings, industrial machines may be used for power generation, water treatment, fossil fuel extraction and other endeavors requiring the interoperation of multiple machines in a coordinated and complex manner. Typically, industrial machines are controlled at least in part by computer code (or a computer program) that is executed by a processor that is located at the machine.

Machines are sometimes organized together into production lines (or into groups or associations such as a windfarm). A multitude of factors affect the operation and efficiency of these production lines or groupings. For example, different human operators may operate different machines. Each of these operators has different skill sets, different schedules, different strengths, and different weaknesses. Various products may also need to be produced at different machines and different times requiring the machines to be re-configured for the production of different components. These factors may and often do change over time.

Because of these issues, production lines are typically not scheduled to produce products in the most efficient ways. Insufficient schedules have created various inefficiencies in the operation of production lines resulting in late deliveries of products among other problems.

Previous attempts to address these problems have been made, but unfortunately, have not been successful.

BRIEF DESCRIPTION OF THE INVENTION

The present invention is directed to optimizing the operation of industrial machines and/or production lines that use these machines. More specifically, embodiments of the invention described herein create an optimized operational schedule for a production line (containing one or more machines), or an optimized schedule for the operation of a grouping of machines (e.g., a wind farm). In aspects, the optimized schedule may specify when the machine is operated, when the machine is scheduled for maintenance, the assignment of specific operators to specific machines at specific times, and the scheduling of the manufacture of specific products at specific machines at specific times. Accordingly, embodiments of the invention described herein may be used to advantageously optimize operations in a production line in a variety of industrial settings to, e.g., improve manufacturing throughput and efficiency, improve power generation in power plants, and improve the efficiencies of fossil fuel extraction amongst a number of other industrial environments utilizing production lines.

Advantageously, the approaches described herein re-route and change production variables (e.g., machine operation, machine maintenance, or operator assignment to mention a few examples) on-the-fly, based upon an issue or failure analysis (e.g., whether the production line is operating correctly or efficiently). The invention herein may optionally be implemented using a computerized industrial internet of things analytics platform that may be deployed at the location of the manufacturing process, at the manufacturing facility premise, or in the cloud. The advantages achieved by the invention described herein were previously unachievable due to, e.g., a lack of required computing power, appropriate sensing technologies and data, and complex machine big data analytic techniques.

In some aspects, an electronic model is used to define a line. The output of the dynamic routing process is a schedule specifying times and personnel used to complete tasks based on production requirements. For example, different employees with specific skills are scheduled to perform certain tasks on specified components/sub-systems at different start times and complete these tasks by different end times depending on their competencies, machine availability, and so forth. Recommendations to users may also be made.

In many of these embodiments, factory or facility configuration information is obtained. The configuration information includes an electronic model describing a configuration of machines in a production line. Customer order information is obtained for a product to be produced by the line. Operational information related to operation of the line is obtained. The factory or facility configuration information, the customer demand information, and the operational information are analyzed to produce an optimal schedule for a usage of the production line. The schedule is then applied to the production line.

In other aspects, the operational information relates to the machine status of one of the machines, the operator availability, the status of a customer order, the inventory at the factory, and/or the farm-out status of tasks to other parties. Other examples are possible.

In other examples, a screen is rendered to a user to present the schedule. In other aspects, a control signal is sent to a processor at the machine to implement the schedule. In some examples, the control signal activates the processor to perform a task in anticipation of the schedule.

In other aspects, the status of the machines is monitored. For instance, when one of the machines fails to operate properly, instructions are sent to a user to perform an action. In some examples, the action is to cause personnel to move from one machine to another. In other examples, the schedule provides a listing of operators that are matched to the machines with start and end times for the operators.

In other embodiments, an apparatus includes an interface, a memory, and a control circuit. The interface has an input and an output. The input of the interface is configured to receive factory configuration information, and the factory configuration information includes an electronic model describing a configuration of machines in a production line. The input of the interface is configured to receive customer order information for a product to be produced by the production line. The input of the interface is also configured to receive operational information related to operation of the production line.

The memory is configured to store the factory configuration information, customer order information, and operational information. The control circuit is coupled to the memory and the interface, and is configured to analyze the factory configuration information, the customer demand information, and the operational information to produce an optimal schedule for the usage of the production line based upon the analysis. The control circuit is configured to apply the schedule to the production line via the output of the interface.

BRIEF DESCRIPTION OF THE DRAWINGS

For a more complete understanding of the disclosure, reference should be made to the following detailed description and accompanying drawings wherein:

FIG. 4 comprises a diagram of one example of a production schedule produced by the approaches described herein according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present approaches advantageously optimize the operational schedule of a production, assembly or generation line, which contains one or more industrial or other complex machines. In one example, factory configuration information and customer demand information (e.g., orders) are entered. Machine status, operator availability, job order status, inventory, and farm-out status information are also entered. An analytic uses this information to determine a schedule, which is presented to a user. The analytic is, for example, computer software, which based on production-line type utilizes rules and understandings to optimally schedule usage of a production line. A computer screen is rendered to a user, in one example, to present the schedule.

Additionally, the analytic may be used to create control signals that control machines on the production line to perform different tasks. For example, a programmable logic controller (PLC) on the production line may be instructed to obtain a specific part in anticipation of the schedule. In another example, machine status is monitored. When the machine fails, personnel are moved to a different machine. Parts can also be moved between machines based on the schedule.

Advantageously, the various inefficiencies that exist in product lines resulting in late deliveries are reduced or eliminated utilizing the present approaches. Furthermore, the present approaches increase on-time delivery with reduced cost and more reliability.

Figure 1:
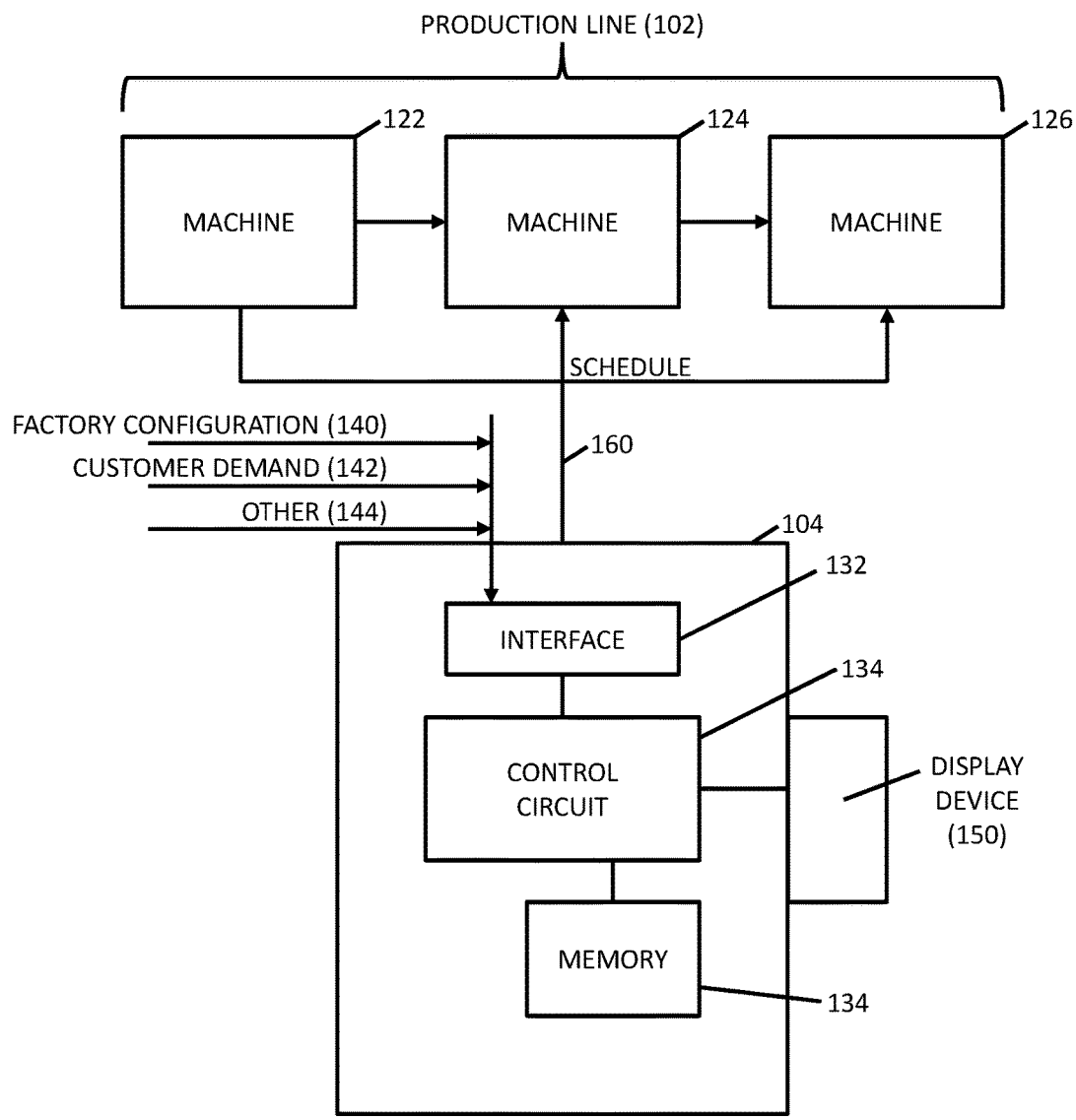
FIG. 1 comprises a block diagram of a system that includes dynamic routing according to various embodiments of the present invention.

Referring now to FIG. 1, one example of a system for dynamic routing of industrial machine resources is described. The system includes a production line 102 (with machines 122, 124, and 126), and an apparatus 104 (including an interface 132, a control circuit 134, and a memory 136).

The production line 102 includes the machines 122, 124, and 126. The machines 122, 124, and 126 may be any type of industrial machines that operate on, or create, any type of product. In examples, the machines 122, 124, and 126 may perform grinding, milling, filling, packaging, moving, or adjusting of a product. In other examples, the production line 102 may be an arrangement or grouping of machines. In examples, the arrangement may be a windfarm and the machines 122, 124, and 126 may be windmills.

The machines 122, 124, and 126 may include sensors or other types of devices that sense any type of information such as pressure, temperature, speed of machine operation, or any other type of characteristic. Other examples are possible. The machines 122, 124, and 126 may also include PLCs that gather the sensed data and/or perform other functions.

The apparatus 104 includes an interface 132, a control circuit 134, and a memory 136. In aspects, the apparatus 104 receives various inputs from various sources and creates an operational schedule for the production line 102.

The interface 132 has an input and an output. The input of the interface 132 is configured to receive factory configuration information 140 (e.g., an electronic model describing a configuration of machines in a production line). The input of the interface 132 is additionally configured to receive customer order information 142 for a product to be produced by the production line. The input of the interface 132 is also configured to receive other operational information 144 related to operation of the production line. Other types of information can be received. The memory 136 is configured to store the factory configuration information 140, customer order information 142, and operational information 144.

The factory configuration information 140, the customer demand information 142, and the operational information 144 may originate from a human operator (and be received via an interface such as a computer), or may originate from a machine, sensor, or database, to mention a few examples. Other examples are possible.

The control circuit 134 is coupled to the memory 136 and the interface 132, and is configured to analyze the factory configuration information 140, the customer demand information 142, and the operational information 144 to produce an optimal schedule for a usage of the production line based upon the analysis. The optimum schedule can be rendered to a user on a display device 150. The display device 150 may be any type of display device such as a computer screen or a touch screen. The control circuit 134 is configured to apply the schedule to the production line via the output of the interface. In aspects, the control circuit 134 may run an analytic that performs these functions.

The control circuit 134 may include any combination of computer hardware and software. In one example, the control circuit 134 includes a microprocessor that executes computer instructions that implement the functions described herein.

The apparatus 104 may itself be a part of or be some other device such as a smart phone, a personal computer, or a tablet, to mention a few examples. Other examples are possible. The apparatus 104 may produce one or more control signals 160 that control the operation of the machines 122, 124, and 126. The control signals may be effective to change the speed of the machine, activate the machine, deactivate the machine, or provide any action that is effective to implement the dynamic schedule that is produced. The control signals 160 may also be messages or alerts to users. In still other examples, the control signals 160 may be combinations of these elements.

Figure 2:
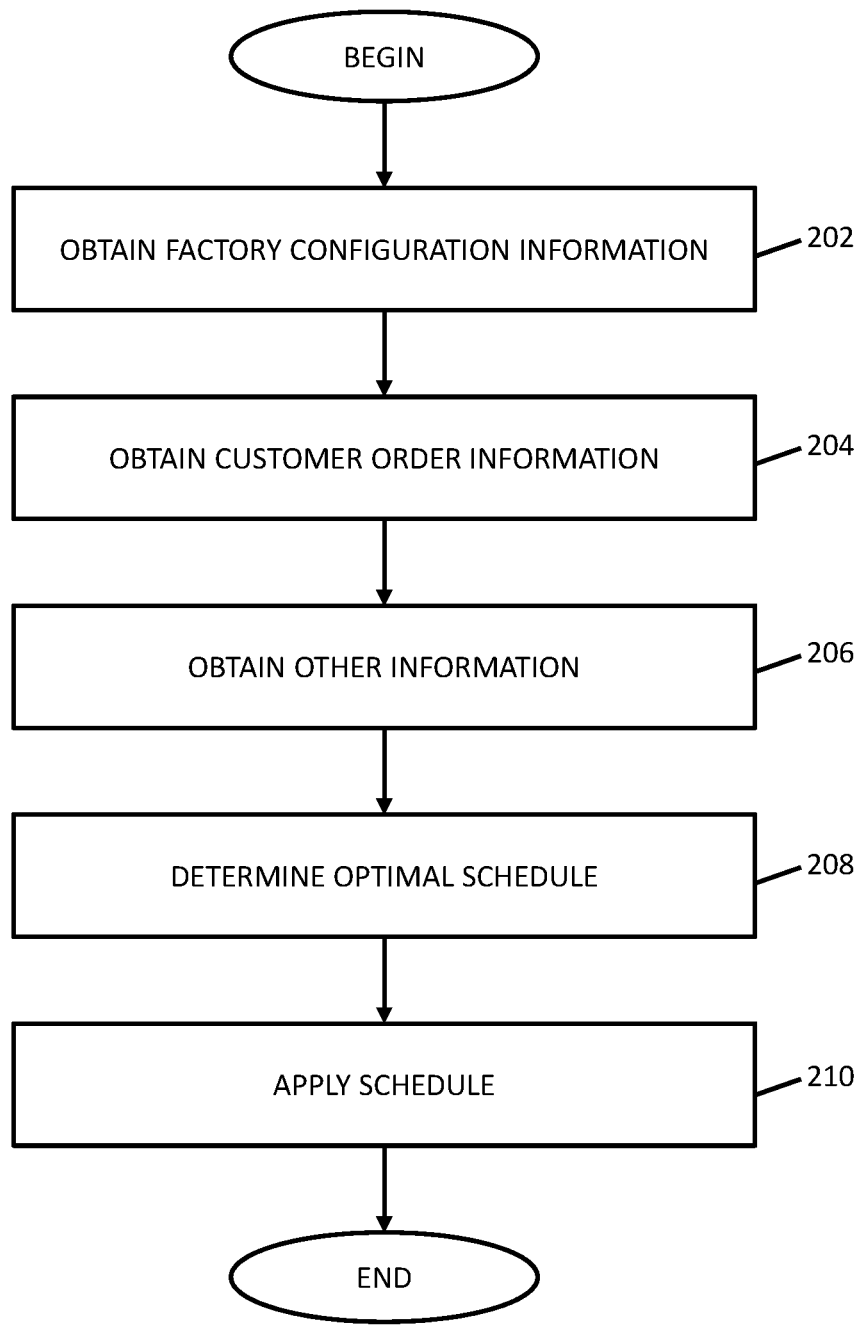
FIG. 2 comprises a flowchart showing an approach for dynamic routing according to various embodiments of the present invention.

Referring now to FIG. 2, one example of an approach for the dynamic routing of production line resources is described. At step 202, factory configuration information is obtained. The configuration information may specify the physical layout of machines (e.g., which machines are connected to which machines), the operational characteristics of machines (e.g., the speed of machines) or the production line. In aspects, the factory configuration information may be an electronic model that represents the layout of the factory, and the interaction of the machines or other elements in the factory.

At step 204, customer order or demand information for a product to be produced by the production line is obtained. The customer order information may specify the identity of the products the customer is ordering, the number of each of the products, and the priority of the products being ordered (when multiple products are ordered). Other examples are possible.

At step 206, operational information related to operation of the production line is obtained. This information may include a listing of operators that can operate the machines, the times these operators are available, and/or the strengths and weaknesses of the operators, to mention a few examples.

At step 208, the factory configuration information, the customer demand (or order) information, and the operational information are analyzed to produce an optimal schedule for a usage of the production line. The analysis may begin by ranking or weighting factors. For example, customer priority may be a high priority while operator skill may be a lower priority. Various algorithms can be used to weigh the various inputs to produce an optimal schedule. For example, the customer priority may be compared to machine and operator availability to produce a best fit between the factors.

To take one specific example, if the customer prioritizes that product A be produced first, then the system may determine whether the machines on the production line are available and when the machines are available. Then, the system may examine the operators of various machines that are needed to make the product, and whether the operators are available. When an operator is not available, then the system may determine a substitute operator. This operation can be repeated for a product B and a product C. Finally, an electronic schedule can be created that schedules the production of products A, B, and C on the production line.

At step 210, the schedule is applied to the production line. In one example, control signals are applied to various machines that implement or help implement the schedule. For example, the machine can be activated or deactivated. Various components of the machine (e.g., valves, levers, or switches) can be actuated. The control signals can also include or be supplemented with messages or other communications. For example, messages can be sent to third party vendors to order supplies that are used by particular machines in preparation for the production process. In another example, messages may be sent to human operators alerting them to the schedule and requesting that they report to the production line.

Figure 3:
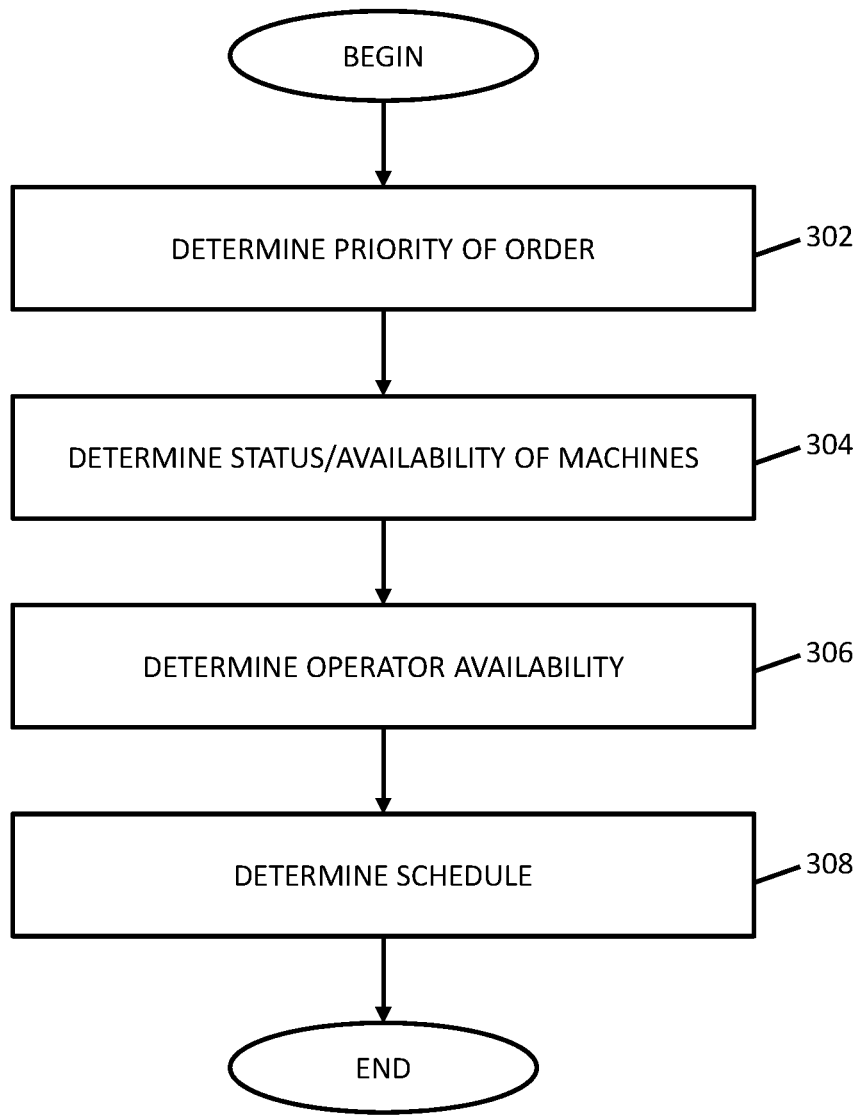
FIG. 3 comprises a flowchart of one approach for determining a schedule according to various embodiments of the present invention.

Referring now to FIG. 3, one example of determining a schedule is described. It will be appreciated that the example of FIG. 3 is one example of an algorithm for determining an optimum schedule for a production line. Other examples are possible.

At step 302, the priority of an order is determined. The priority may be indicated by a ranking (e.g., a letter or a number). In other examples, the priority may be high, medium, or low. Other examples are possible.

At step 304, the availability of machines is determined. For example, a first machine may only be available on certain days and times. The availability may be indicated by electronic control signals received directly from the machines. In other examples, a human operator at a location (other than the machine) may indicate the availability of the machine. In one specific example, the availability may be "available" (if the machine is available for production), "disabled" (if for some reason the machine is deactivated due to an operational failure), or "undergoing maintenance" (if the machine is undergoing routine maintenance). Other examples are possible.

At step 306, the availability of various operators are determined. For example, Operator A may be available all the time, or on certain days and times. Operator B may be on vacation and not available until after a certain date. Other examples are possible.

At step 308, all this information is analyzed to determine a schedule based upon rules. For example, machines may be scheduled at times they are available with operators capable of operating the machines. Higher priority orders may be placed first. A best attempt may be made to find an optimum schedule by weighting these factors. In some examples, different weights may be attached to different factors (e.g., customer priority may be given the highest priority while operator skill may be given a lower priority).

Referring now to FIG. 4, one example of schedule 400 is described. The schedule has a first column 402, a second column 404, a third column 406, and a fourth column 408. The schedule 400 is also divided into various rows 412, 414, 416, and 418. The schedule may be rendered to a human user on a display screen, may be emailed to operators (e.g., for example, while they are at their homes), or may be sent to a central location where employees who are responsible for the operation of the production line may analyze, approve, and/or modify the schedule.

In addition, the system may create electronic control signals that implement the schedule. In one example, control signals are applied to various machines that implement or help implement the schedule. The machine can be activated or deactivated. Various components of the machine (e.g., valves, levers, or switches) can be actuated. The control signals can also include or be supplemented with messages or other communications. For example, messages can be sent to third party vendors (or others) to order supplies that are used by particular machines in preparation for the production process. In another examples, messages may be sent to human operators alerting them to the schedule and requesting that they report to the production line.

Each of the rows 412, 414, 416, and 418 represent a scheduled event. For example, row 412 may indicate the production of product A. Row 414 includes scheduled maintenance or other downtime for the entire production line. Row 416 represents the resumed production of product A. Row 418 represents the production of product B.

Each of the columns in the schedule 400 gives details as to the event. The first column 402 describes the date and times of the event. The second column 404 represents the product being produced. The third column 406 represents the machines being used in the production of a product. And, the fourth column 408 represents the operators that are being used at the machines. It will be understood that other columns with other types of information may also be utilized.

As mentioned, the information in the schedule can be converted or transformed into control signals that perform a physical action. For example, when the operators are determined, electronic email may be sent to the operators informing the operator.

It will be understood that the approaches herein are used to dynamically and in real-time produce schedules that cause the production line to be operated efficiently and meet customer needs. Thus, as time advances, the algorithms described herein can be re-run and new optimum schedules produced. For example, once a day, schedules can be adjusted as customer priority changes, machine or operator availability changes, or new orders are received.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed is:

1. A method of controlling the operation of industrial machines, comprising:
   obtaining factory configuration information, the factory configuration information including an electronic model describing a configuration of machines in a production line at a factory;
   obtaining customer order information for a product to be produced by the production line;
   obtaining operational information related to operation of the production line;
   analyzing the factory configuration information, the customer demand information, and the operational information to produce an optimal schedule for a usage of the production line; and
   applying the schedule to the production line;
   wherein the schedule is applied to a first selected industrial machine on the production line at least in part by electronic control signals, and the electronic control signals, when applied to the first selected industrial machine, are effective to control one or more of: a speed of the first selected machine, an activation of the first selected machine, or a deactivation of the first selected machine;
   wherein electronic messages are created and transmitted to direct resources to a second selected machine on the production line, the electronic messages being one or more of a message to a human operator requesting the human operator to report for work at the second selected machine on the production line, or an electronic order sent to a third party vendor to order supplies or parts that are used by the second selected machine, wherein the supplies or parts ordered from the third party vendor are moved to and utilized by the second selected machine in a production process.

2. The method of claim 1, wherein the operational information relates to one or more of a machine status of one of the machines, operator availability, a status of a customer order, an inventory at the factory, and farm-out status of tasks.

3. The method of claim 1, further comprising rendering a screen to a user in order to present the schedule.

4. The method of claim 1, wherein applying the schedule comprises sending a control signal to a processor at a selected one of the machines on the production line.

5. The method of claim 4, wherein the control signal activates the processor to perform a task that implements or anticipates at least a portion of the schedule.

6. The method of claim 1, further comprising monitoring the status of the machines.

7. The method of claim 6, wherein when one of the machines fails to operate properly, instructions are sent to a user to perform an action.

8. The method of claim 7, wherein the action is to cause personnel to move from one machine to another.

9. The method of claim 1, wherein the schedule provides a listing of operators that are matched to the machines with start and end times.

10. An apparatus, comprising:
    an interface with an input and an output, the input of the interface configured to receive factory configuration information, the factory configuration information including an electronic model describing a configuration of machines in a production line at a factory, the input of the interface configured to receive customer order information for a product to be produced by the production line, the input of the interface configured to receive operational information related to operation of the production line;
    a memory, the memory configured to store the factory configuration information, customer order information, and the operational information; and
    a control circuit that is coupled to the memory and the interface, the control circuit configured to analyze the factory configuration information, the customer demand information, and the operational information, and to produce an optimal schedule for a usage of the production line, the control circuit configured to apply the schedule to the production line via the output of the interface;
    wherein the schedule is applied by the control circuit to a first selected industrial machine on the production line at least in part by electronic control signals, and the electronic control signals, when applied to the first selected industrial machine, are effective to control one or more of: a speed of the first selected machine, an activation of the first selected machine, or a deactivation of the first selected machine;
    wherein electronic messages are created and transmitted by the control circuit to direct resources to a second selected machine on the production line, the electronic messages being one or more of a message to a human operator requesting the human operator to report for work at the second selected machine on the production line, or an electronic order sent to a third party vendor to order supplies or parts that are used by the second selected machine, wherein the supplies or parts ordered from the third party vendor are moved to and utilized by the second selected machine in a production process.

11. The apparatus of claim 10, wherein the operational information relates to one or more of a machine status of one of the machines, operator availability, a status of a customer order, an inventory at the factory, and farm-out status of tasks.

12. The apparatus of claim 10, further comprising a display device and wherein the control circuit is configured to render a screen to a user in order to present the schedule on the display device.

13. The apparatus of claim 10, wherein the control circuit is configured to send a control signal to a processor disposed at a selected one of the machines in order to apply the schedule.

14. The apparatus of claim 13, wherein the control signal activates the processor to perform a task to implement or in anticipation of the schedule.

15. The apparatus of claim 10, wherein the control circuit is configured to monitor the status of the machines via the input of the interface.

16. The apparatus of claim 15, wherein the control circuit is configured to when one of the machines fails to operate properly, instructions are sent to a user to perform an action via the output of the interface.

17. The apparatus of claim 16, wherein the instructions cause personnel to move from one machine to another.

18. The apparatus of claim 10, wherein the schedule provides a listing of operators that are matched to the machines with start and end times of the operators.

* * * * *